Feb. 25, 1969 Y. M. HOAG 3,429,579

DRIVE MECHANISM FOR TAPE RECORDER

Filed April 14, 1967 Sheet 1 of 3

INVENTOR:
YATES M. HOAG,
BY William S. Wolfe
HIS ATTORNEY.

DRIVE MECHANISM FOR TAPE RECORDER

Filed April 14, 1967

INVENTOR:
YATES M. HOAG,
BY William S. Wolfe
HIS ATTORNEY.

INVENTOR:
YATES M. HOAG,
BY William S. Wolfe
HIS ATTORNEY.

1

3,429,579

DRIVE MECHANISM FOR TAPE RECORDER

Yates M. Hoag, Utica, N.Y., assignor to General Electric Company, a corporation of New York Filed Apr. 14, 1967, Ser. No. 630,981

U.S. Cl. 274—4 5 Claims

Int. Cl. G11b *5/00*

ABSTRACT OF THE DISCLOSURE

A tape recorder wherein a unidirectionally rotating drive motor for a turntable is powered at full voltage during record, play and rewind to reduce excessive wow and flutter. The motor is mounted on a movable arm which is operatively engaged by a function switch. The movable arm may be manipulated by operation of the function switch to cause the motor to be moved alternately to drive a first turntable in one direction or to drive a second tunntable, through a speed reduction arrangement, in an opposite direction and at a slower speed.

*Background of the invention*

This invention relates to magnetic tape recorders and, more particularly, to a drive mechanism for a magnetic tape recorder.

Present rim-driven battery powered tape recorders, especially the more inexpensive models, encounter excessive wow and flutter, that is, tones which vary above and below the actual tone because of variation in the rate of speed of the drive motor for the recording and reproducing mechanism. One reason for speed variation of the drive motor is that in present rim drives, the motor shaft directly drives the turntable rims. However, due to practical size limitations of the motor shaft and of the turntable diameters, it is not possible to obtain the low drive ratio necessary to operate the take-up table (for play and recording modes) at the required slow speed with available low-cost D.C. commutator motors. Up to now, this slower speed has been obtained by running the motor on a lower-than-rated voltage. Underpowering the system in such a manner means, however, that even a very slight variation in load from the moving reels and tape will cause motor speed fluctuations. Thus, excessive flutter and wow will occur in such devices.

Present systems also require double pole-double throw (DPDT) switching to reverse the drive motor when the motor shaft is brought into engagement with the pay-out table for rewinding. Furthermore, in order to obtain a fast rewind, it is common practice to supply the motor with full voltage during the rewinding operation. This produces an undesirable side effect in that the portion of the battery bank into which the motor is tapped for its slow forward speed discharge faster than the remaining cells which furnish power only during the rewinding operations.

*Summary of the invention*

It is an object of this invention to produce a rim-driven tape recorder wherein the drive motor is always powered at full voltage so that wow and flutter are substantially reduced.

It is another object of this invention to produce a rim-driven tape recorder requiring only a unidirectionally driven motor so that the necessity for reverse switching is eliminated.

In accordance with my invention in one form thereof, I provide a tape recorder wherein a reduction idler interposed between first and second turntables drivingly engages the first turntable. A motor mounted at one end

2 of a pivoted arm is powered at full voltage and includes a unidirectionally rotating shaft interposed between the idler and the second turntable. The other end of the pivoted arm is operatively engaged by a function switch, operation of which pivots the arm to move the motor shaft either to engage and to drive the second turntable in one direction or to engage the idler and thereby to drive the first turntable at a slower speed in an opposite direction.

*Detailed description*

Other objects and advantages of my invention may better be understood by reference to the following dedetailed description taken in connection with the accompanying drawings in which.

Figure 1:
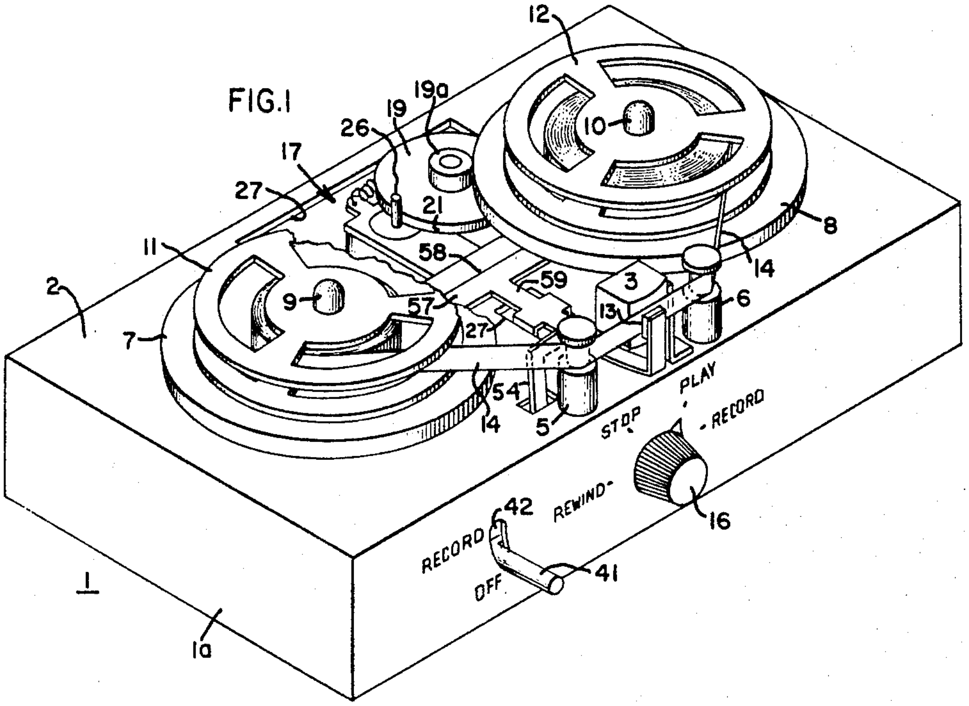
FIGURE 1 is a perspective view of a tape recorder including the drive mechanism of the present invention.

Referring now to the drawings, and FIGURE 1 in particular, a sound reproducing machine such as a magnetic tape recorder 1 is shown. The recorder 1 includes a generally box-like housing 1*a* and a mounting surface or plate 2 having a recording head 3 mounted thereon and guide posts 5 and 6 associated therewith and forming a tape path. A pair of driven turntables 7 and 8 are provided, the turntable 7 and 8 being mounted on rotatable spindles 9 and 10 respectively. One turntable 8 is designated as the "take-up" table, and the other turntable 7 is designated as the "pay-out" table. The spindles 9 and 10 are adapted to receive tape reels 11 and 12, for magnetic tape or the like, for rotation thereon.

A shiftable pressure pad 13 is located directly opposite the recording head 3 to hold the tape 14 in operating contact with the recording head 3 when required. A conventional erase magnet 15 is movably positioned adjacent the tape. The operation of the recorder 1 is effected by means of a rotatable control dial 16 which is operatively connected to a recorder drive mechanism 17. The dial 16 is rotatable to one of four positions or modes, "rewind," "stop," "play," and "record." Other controls for operation elements such as the recorder amplifier and for supplying power to the recorder may be conventionally provided, and are not shown since they form no part of the present invention.

Figure 2:
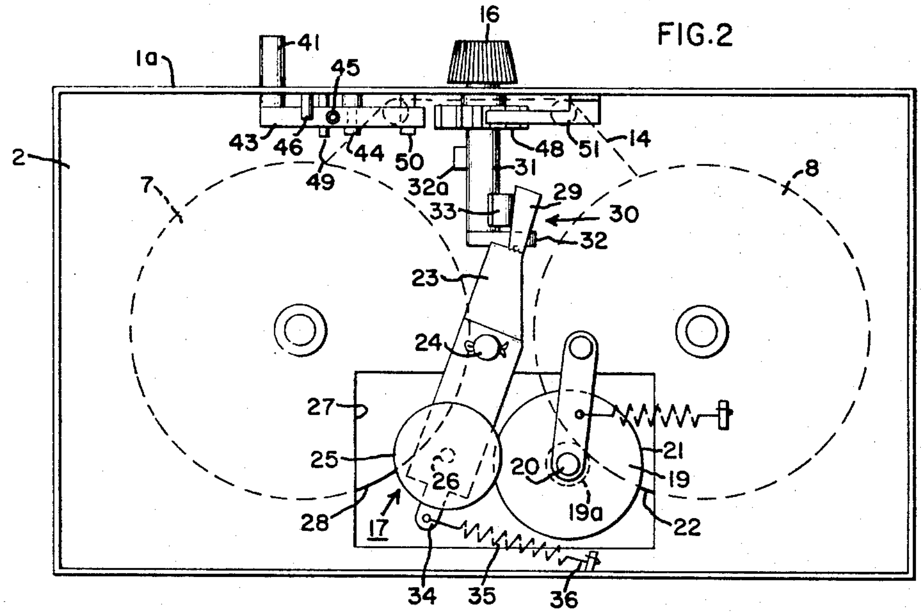
FIGURE 2 is a bottom view of the tape recorder showing the drive mechanism in a stop mode.
Figure 3:
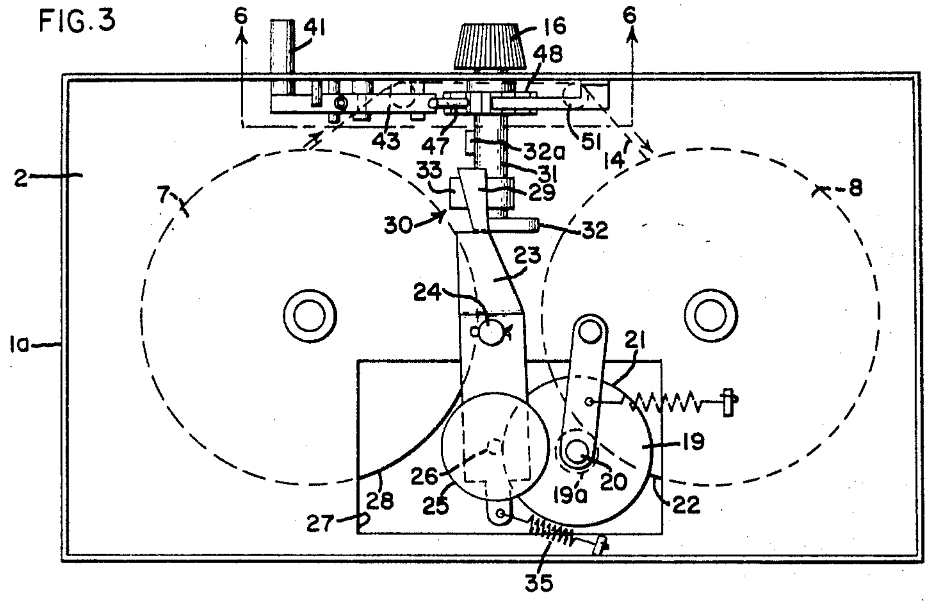
FIGURE 3 is a bottom view of the tape recorder showing the drive mechanism in a play mode.
Figure 5:
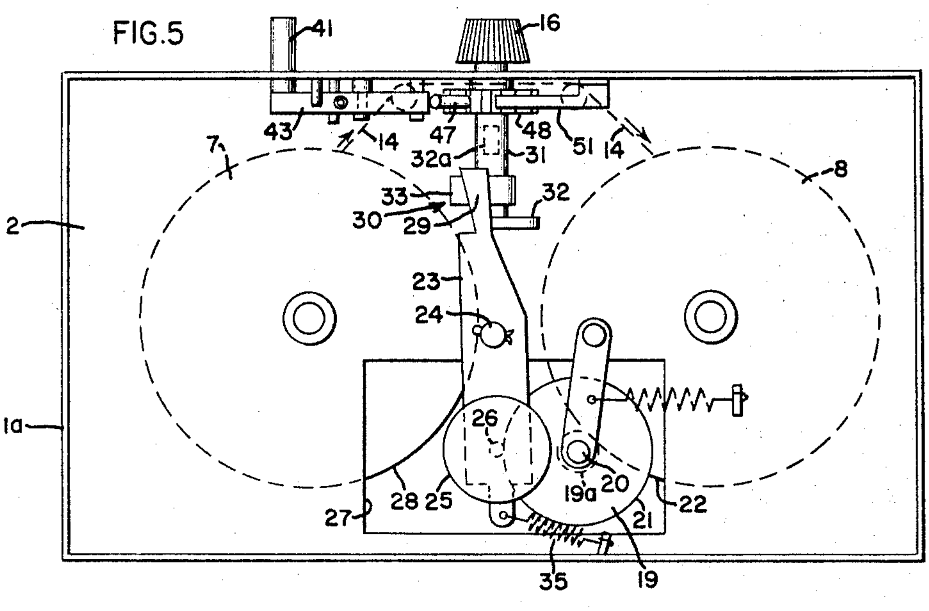
FIGURE 5 is a bottom view of the tape recorder showing the drive mechanism in a record mode.

The novel drive mechanism 17 for the recorder 1 will now be described. Referring to FIGURES 2, 3, and 5, there is shown within the housing 1*a* a speed reduction means in the form of an idler wheel 19 having a drive hub 19*a* thereon, the idler wheel being supported on a shaft 20 for free rotation thereabout. The idler wheel 19 is interposed between the take-up table 8 and the pay-out table 7 and includes an outer rim 21 adapted to be driven by a suitable drive motor with the drive hub 19*a* in driving engagement with the rim 22 of the take-up table 7. A pivoted bracket arm 23 is disposed on the underside of the mounting plate 2 and is pivotally supported thereon by means of pivot pins 24 which may be conveniently disposed at a central portion thereof. One end of the bracket arm 23 supports a drive motor 25. The drive motor 25 includes a rotatable driven shaft 26 which extends upwardly through an opening 27, shown in FIGURE 1, in the mounting plate 2. The motor shaft 26 is positioned between the rim 28 of the pay-out table 7 and the rim 21 of the idler 19. The free other end 29 of the motor bracket arm 23 comprises a generally L-shaped portion which is operatively engaged by a function switch arrangement 30 for orienting the motor shaft 26 in a number of positions to correspond with the modes of operation to be selected by the operator.

The function switch arrangement 30 comprises a rotatable shaft 31 which can be rotated by manipulation of the control knob 16 on the outside of the recorder housing 1*a*. The rotatable shaft 31 includes a step cam 32 fixedly mounted at the free end thereof, a second cam member 32*a*, and a leaf spring 33 which is affixed to the shaft 31 intermediate the step cam 32 and cam member 32*a*.

As viewed in FIGURE 2, one end 34 of a spiral spring 35 is connected to the motor-supporting portion of the bracket arm 23 and its other end 36 is suitably connected within the recorder housing 1*a* and serves to bias the motor bracket arm 23 for rotation in counterclockwise direction, as viewed in FIGURE 2. In order to overcome the biasing effect of the spring 35, the leaf spring 33 is adapted to exert a force upon the other end 29 of the motor bracket arm 23 so as to cause rotation of the motor bracket arm 23 in a clockwise direction.

In normal operation of the recorder 1, as shown in FIGURE 1, a tape reel 11 having a suitable tape roll 14 wound thereabout is placed on the pay-out table 7 and threaded through the tape path formed by the heads 3 and 4 and guides 5 and 6 whereupon it is secured to the hub of an empty tape reel 12 mounted on the spindle 10 of the take-up table 8. When the recorder 1 is in a stop or off position, as in FIGURE 2, the leaf spring 33 on the control shaft 31 is in a generally downwardly extending position and engages the free end 29 of the motor bracket arm 23 and counterbalances the force of the spring 35 sufficiently so that the motor shaft 26 engages neither the pay-out table rim 28 nor the idler wheel rim 21.

Referring to FIGURE 3, when it is desired to operate the recorder, such as playing an already recorded tape roll, the control knob 16 is rotated to the play mode, thereby causing the leaf spring 33 to rotate and move away from the free end 29 of the motor bracket arm 23 whereupon the spring 35 rotates bracket arm 23 in a counteclockwise direction and the motor shaft 26 engages the idler wheel rim 21. Concurrent actuation of the motor 25 allows the motor shaft 26 to rotate and thereby to drive the take-up table 8 through the idler wheel 19 and the associated drive hub 19*a* at a desired speed. Because of the presence of the idler wheel 19, the motor 25 may be operated at full voltage, in that the idler wheel 19 and the associated drive hub 19*a* provides the necessary speed reduction so that the take-up table 9 is rotated at a sufficiently slow speed.

Figure 4:
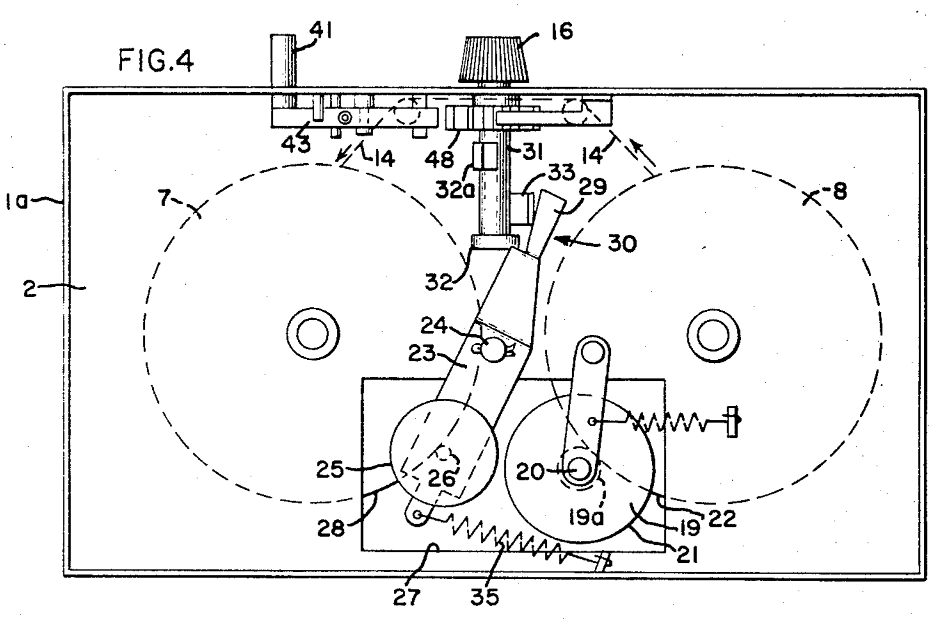
FIGURE 4 is a bottom view of the tape recorder showing the drive mechanism in a rewind mode.

After the play mode has been completed, the tape roll 14 may be rewound about the tape reel 11 on the pay-out table 7 by rotation of the control dial 16 to the rewind mode. As best seen in FIGURE 4, this causes the leaf spring 33 to engage the free end 29 of the bracket arm 23 and rotate it in a clockwise direction, thereby overcoming the force of the spring 35. The rotation of the bracket arm 23 causes the motor supporting portion thereof to pivot and move the motor shaft 26 into engagement with the rim 28 of the pay-out table 7. The leaf spring 33 also provides a resilient spring load for motor shaft 26 during the rewind operation to insure constant engagement between the shaft 26 and the rim 28 at an optimum pressure. Concurrent actuation of the drive motor 25 allows the motor shaft 26 to drive the pay-out table 7 until the tape 14 is completely rewound. Since the motor shaft 26 directly drives the pay-out table 7, it can be seen that the pay-out table 7 will rotate at a much faster rate of speed than the rate at which the take-up table 8 is driven. Thus, the drive motor 25 may be operated at full voltage for all driving modes so that excessive wow and flutter characteristic of the under-powered motors used in the prior art is substantially eliminated. Furthermore, it can be seen that the motor shaft 26 is always driven in the same direction regardless of the operating mode so that the need for any reverse switching of the motor is also eliminated.

Figure 6:
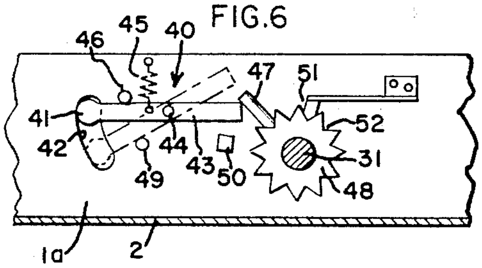
FIGURE 6 is a section view taken along line 6—6 of FIGURE 3 and shows the operation of the safety stop for the recorder.

Referring now to FIGURES 5 and 6, when it is desired to record new material on a tape 14, the drive mechanism is caused to be oriented in a position similar to that of the play mode. To produce the record mode position, however, the control knob 16 is allowed to rotate through a greater arc than for the play mode. This extra rotation of the control knob 16 is effected by means of a safety stop device 40, as shown most clearly in FIGURE 6 which must be actuated before the recorder 1 may be placed in the record mode. This device 40 is provided to insure that an operator desiring a "play" mode does not rotate the control knob 16 past the play mode and accidentally into the record mode.

The safety stop device 10, as shown in FIGURE 6, includes an operating pin 41 which extends through an arcuate slot 42 in the front wall of the recorder, as shown in FIGURE 1, and which is connected to one end of a stop arm 43 pivotally mounted at its center portion by means of a pivot pin 44 connected to the front wall. The stop arm 43 is normally biased by a spring 45 and is retained in a generally horizontal position by suitable means such as a stop pin 46 affixed to the front wall of the recorder 1. A stop member 47 is positioned on a toothed disc 48 mounted for rotation with the control shaft 31 and is so oriented as to be interfered with by the free end of the stop arm 43 when the control dial 16 and control shaft 31 have been rotated to the play mode. When the record mode is desired, however, the pin 41 is first moved downwardly by the operator to the other end of the slot (dotted lines) whereupon further rotation of the stop arm 43 is resisted by a stop pin 49. Since the free end of the stop arm 43 now clears the stop member 47, the control knob 16 and control shaft 31 may be rotated until the stop member 47 is interfered with by a fixed post 50 which determines the record mode of the recorder. A spring loaded detent 51 or the like is provided to cooperate with the notches 52 in the disc 48 to retain the control dial 16 and control shaft 31 in the various operating modes.

Figures 7, 8, 9:
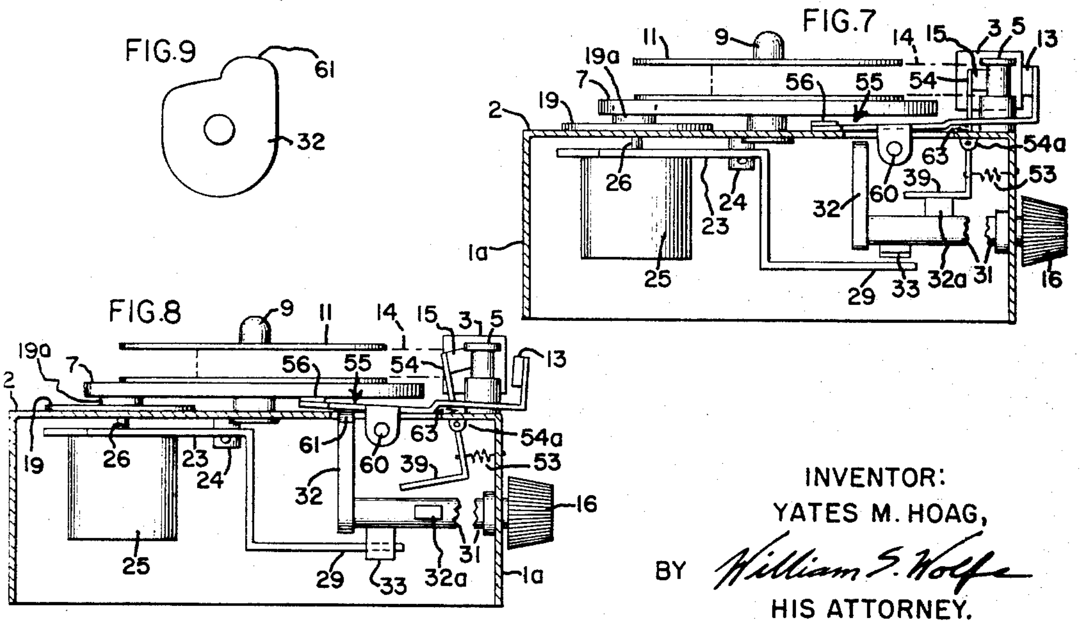
FIGURES 7 and 8 show the operation of a brake means for the recorder.
FIGURE 9 is a plan view of a step cam mounted on the control shaft of the recorder.

Referring now to FIGURES 7 and 8, rotation of the control shaft 16 to the record mode allows the cam member 32*a* to be rotated and move the erase magnet 15 into engagement with the tape 14. Normally, the erase magnet 15 which is mounted on an arm 54 pivoted at 54*a* is biased by a spring 53 away from engagement with the tape 14, as shown in FIGURE 8. However, when the control dial 16 is rotated to the record mode, the cam member 32*a* engages and forces upwardly a cam follower 39 comprising an arm member operatively connected to the arm 54. The erase magnet 15 is thereby pivoted into engagement with the tape 14 as shown in FIGURE 7.

Referring to FIGURES 1, 7 and 8, brake means 55 are also provided to prevent rotation of the turntables when the recorder 1 is in the off or stop position. The brake means 55 comprise a pair of brake pads 56, one for each turntable, mounted at opposite ends of the short leg 57 of a T-shaped member 58. The longer leg 59 of the T-shaped member 58 is pivoted by means of a pivot pin 60 supported on the mounting plate 2. The free end of the longer leg 59 supports the recording head pad 13 which is movably mounted for engagement against the recording head 3. In the off or stop position, a cam portion 61 on the step cam 32 shown in detail in FIGURE 9 engages a portion of the longer leg of the T-shaped arm 58 to force the brake pads 56 against the respective turntables 7 and 8 as shown in FIGURE 8. The recording head pad 13 on the other end of the leg 59 at this time is kept away from the recording head 3. The cam portion 61 on the step cam 32, shown in FIGURE 9, includes a generally tapering surface so that, during the rewind mode, the head pad 13 is still retained partly back from the head even though the brake pads 56 are released from engagement with the turntables. Rotation of the control shaft 16 to the play and record modes, however, disengages the step cam 32 from the T-shaped arm 58 so that a spring member 63 forces the pad 13 toward the recording head 3 to place the tape 14 into engagement with the recording head and bias the brake pads 56 away from the turntables.

I have thus described a simplified tape recorder wherein a single unidirectionally rotating drive motor for the turntables is continuously powered at full voltage to reduce excessive wow and flutter. The motor is mounted on a movable arm which is operatively engaged by a function switch arrangement, operation of which causes the motor to be moved alternately to drive a first turntable in one direction or to drive a second turntable through a speed-reducing idler gear in an opposite direction. Many elements and mechanisms conventionally associated with tape recorders may obviously be utilized with the present invention, and therefore, have not been described since they form no part of the present invention.

What I claim as new and desire to secure by Letters Patent of the United States is:

1. In a magnetic tape recorder including first and second spaced turntables for receiving tape reels for rotation therewith and having rims thereabout, and further including recording and erase heads and tape guide members defining a tape path between said turntables, a mechanism for driving said turntables comprising:

(a) speed reduction means drivingly engaging a rim portion of said first turntable;

(b) a unidirectionally rotatable drive motor having a shaft interposed between said speed reduction means and said second turntable;

(c) movable means for supporting said motor and for alternately moving said motor between a position wherein said rotatable shaft drivingly engages said speed reduction means and a position wherein said rotatable shaft drivingly engages a rim portion of said second turntable; and (d) manually operable means operatively connected to said movable means for controlling the movement thereof.

2. The tape recorder as recited in claim 1 wherein said speed reduction means comprises an idler wheel having a drive hub thereon interposed between said first turntable and said rotatable shaft.

3. The tape recorder as recited in claim 1 wherein said movable means comprises a pivoted arm supporting said motor at one end thereof and operatively engaged by said manually operable means for responsive movement at the other end thereof.

4. The tape recorder as recited in claim 1 wherein said movable means comprises a pivoted arm supporting said motor at one end thereof, and first spring means normally biasing said pivoted arm in a direction so that said motor shaft drivingly engages said speed reduction means, said manually operable means including second spring means engageable with the other end of said pivoted arm for overcoming the force of said first spring means to pivot said pivoted arm and cause it to move said motor shaft into driving engagement with said rim portion of said second turntable.

5. The tape recorder as recited in claim 4 wherein said manually operable means comprises a rotatable shaft including thereon a leaf spring member engageable with the other end of said pivoted arm for overcoming the force of the said first spring means when said shaft is rotated, whereby said pivoted arm is pivoted into driving engagement with said rim portion of said second turntable.

References Cited

UNITED STATES PATENTS 2,668,059 2/1954 Roberts.
2,583,385 1/1952 Miller.

LEONARD FORMAN, *Primary Examiner.*

R. A. FIELDS, *Assistant Examiner.*

U.S. Cl. X.R.

179—100.2